US011074341B2

(12) United States Patent
Monsonego et al.

(10) Patent No.: US 11,074,341 B2
(45) Date of Patent: Jul. 27, 2021

(54) DYNAMIC CYBERSECURITY PEER IDENTIFICATION USING GROUPS

(71) Applicant: Microsoft Technology Licensing, LLC, Redmond, WA (US)

(72) Inventors: Jonathan Moshe Monsonego, Tel Aviv (IL); Itay Argoeti, Petch Tikva (IL); Amir Harar, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 340 days.

(21) Appl. No.: 16/271,835

(22) Filed: Feb. 10, 2019

(65) Prior Publication Data

US 2020/0257797 A1 Aug. 13, 2020

(51) Int. Cl.
*H04L 29/06* (2006.01)
*G06F 21/55* (2013.01)

(52) U.S. Cl.
CPC ...... *G06F 21/552* (2013.01); *G06F 2221/034* (2013.01)

(58) Field of Classification Search
CPC ... G06F 21/552; G06F 2221/034; H04L 67/22
See application file for complete search history.

(56) References Cited

U.S. PATENT DOCUMENTS 9,727,723 B1 8/2017 Kondaveeti et al.
10,498,755 B2 * 12/2019 Harris ............ G06F 15/16
2012/0284793 A1 * 11/2012 Steinbrecher ...... G06F 21/552
726/23
2013/0305357 A1 11/2013 Kyyagari et al.
2014/0150066 A1 5/2014 Chandolu et al.
2017/0103203 A1 4/2017 Sharma et al.
2018/0234443 A1 8/2018 Wolkov et al.

(Continued)

OTHER PUBLICATIONS

"International Search Report and Written Opinion Issued in PCT Application No. PCT/US2020/014548", dated Apr. 7, 2020, 14 Pages.

(Continued)

*Primary Examiner* — Brandon S Hoffman
*Assistant Examiner* — William A Corum, Jr.
(74) *Attorney, Agent, or Firm* — Ogilvie Law Firm

(57) ABSTRACT

Cybersecurity peer identification (CPI) technology obtains security group definitions from an identity directory, computes peerSimilarityScores that represent user similarity in terms of security permissions, and submits contextual cybersecurity peer data to cybersecurity peer-based functionality (CPBF). CPBF code may then perform behavior analytics, resource management, permissions management, or location management. Cyberattacks may then be disrupted or mitigated, and inefficiencies may be avoided or decreased. Having smaller security groups in common gives users higher peerSimilarityScores than having larger groups in common, as a result of logarithmic, reciprocal, or other score functions. Security group definitions are refreshed and peer scores are updated at regular intervals or on demand by CPI code, to avoid staleness. CPI code may be tuned by varying update intervals, varying cutoffs imposed on the size of security groups deemed suitable for use in computing peerSimilarityScores, or varying other parameters.

20 Claims, 5 Drawing Sheets

EXAMPLE OF A
CYBERSECURITY PEER IDENTIFICATION METHOD 1100

(56) References Cited

U.S. PATENT DOCUMENTS

| | | | |
|---|---|---|---|
| 2018/0248895 A1 | 8/2018 | Watson et al. | |
| 2018/0375886 A1 | 12/2018 | Kirti et al. | |
| 2019/0349391 A1 | 11/2019 | Elsner et al. | |
| 2020/0019365 A1* | 1/2020 | Spooner | H04W 4/029 |
| 2020/0169565 A1* | 5/2020 | Badawy | H04L 63/105 |

OTHER PUBLICATIONS

"Big data", Retrieved from: https://en.wikipedia.org/wiki/Big_data, Jan. 5, 2020, 16 Pages.

"Cache (computing)", Retrieved from: https://en.wikipedia.org/wiki/Cache_(computing), Dec. 25, 2019, 08 Pages.

"Locality of Reference", Retrieved from: https://en.wikipedia.org/wiki/Locality_of_reference, Dec. 7, 2019, 06 Pages.

"22 Best Alternatives to Microsoft Active Directory", retrieved from <<https://merabheja.com/22-best-alternatives-to-microsoft-active-directory/>>, Jan. 20, 2018, 14 pages.

"User behavior analytics", retrieved from <<https://en.wikipedia.org/wiki/User_behavior_analytics>>, Oct. 26, 2018, 3 pages.

"Splunk® User Behavior Analytics", retrieved from <<https://www.splunk.com/pdfs/fact-sheets/splunk-user-behavior-analytics.pdf>>, 2015, 3 pages.

"Securonix User and Entity Behavior Analytics", retrieved from <<https://www.securonix.com/products/ueba/>>, no later than Feb. 9, 2019, 6 pages.

"Exabeam Advanced Analytics", retrieved from <<https://www.exabeam.com/product/exabeam-advanced-analytics/>>, no later than Feb. 9, 2019, 4 pages.

"User Behavior Analytics (UBA)", retrieved from <<https://www.rapid7.com/fundamentals/user-behavior-analytics/>>, no later than Feb. 9, 2019, 6 pages.

"Intelligent Security Operations", retrieved from <<https://www.mcafee.com/enterprise/en-us/solutions/intelligent-security-operations.html>>, no later than Feb. 9, 2019, 9 pages.

"Symantec Information Centric Analytics", retrieved from <<https://www.symantec.com/content/dam/symantec/docs/data-sheets/information-centric-analytics-en.pdf>>, 2018, 2 pages.

"CBA: RSA Cloud Behavioral Analytics", retrieved from <<https://community.rsa.com/docs/DOC-86678>>, Sep. 11, 2018, 3 pages.

"International Search Report and Written Opinion Issued in PCT Application No. PCT/US2020/064749", dated Mar. 22, 2021, 12 Pages.

* cited by examiner

SOME ASPECTS 300 OF SECURITY GROUP DEFINITIONS 216

SECURITY GROUP 214 IDENTIFIER 302

MEMBERSHIP LIST 304: IDENTIFIERS 206 OF USER ACCOUNTS 204 OF USERS 104

Fig. 3

SOME ASPECTS 400 OF USER ACCOUNTS 204

HISTORY 402 OF ACTIVITIES 404

USER 104 | SECURITY PERMISSIONS 406

Fig. 4

SOME EXAMPLES OF ACCOUNT 204 ENVIRONMENTS 100

| PUBLIC CLOUD 502 | PRIVATE CLOUD 504 |
| HYBRID CLOUD 506 | PRIVATE NETWORK 508 |

Fig. 5

SOME EXAMPLES 600 OF CYBERSECURITY PEER-BASED FUNCTIONALITIES 236

INTRUSION DETECTION OR PREVENTION OR BOTH 602

| BEHAVIOR ANALYSIS 604 | RESOURCE MANAGEMENT 606 |
| USER PERMISSIONS MANAGEMENT 608 | USER LOCATION MANAGEMENT 610 |

Fig. 6

SOME TUNING PARAMETERS 1000:
MAX GROUP SIZE 702, UPDATE INTERVAL 220,
NUMBER N 1002 OF CLOSEST PEERS 210, CONSTANTS 1004

Fig. 10

EXAMPLE OF A
CYBERSECURITY PEER IDENTIFICATION METHOD 1100

START

OBTAIN 1102 SECURITY GROUP DEFINITIONS

COMPUTE 1106 PAIRWISE SIMILARITY SCORES ← FILTER OUT 1104 LARGE GROUPS, SINGLETONS

SUBMIT 1108 PAIRS AND SCORES FOR UTILIZATION 1110 AS CONTEXTUAL DATA IN PERFORMANCE 1112 OF FUNCTIONALITY WHICH ENHANCES 1114 SYSTEM SECURITY OR EFFICIENCY

FINISH

Fig. 11

DYNAMIC CYBERSECURITY PEER IDENTIFICATION USING GROUPS

BACKGROUND

Noon Attacks on computing systems take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within a computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place.

In particular, installing tools and techniques for detecting unusual behavior is one of the many possibilities to consider when implementing defense in depth. Tools and techniques have been developed for user behavior analytics (UBA) and for user and entity behavior analytics (UEBA), which may detect financial fraud, insider threats, targeted attacks from external sources, and other malicious behaviors in the context of routine and authorized behaviors. UBA and UEBA look at patterns of behavior by humans or by automated entities or both, and then apply algorithms (which may in turn apply statistical analysis) to detect significant departures from established patterns of behavior. Those departures, which may also be referred to as "anomalies", are then investigated as potential threats. Even when a given behavior is not malicious or harmful, designating it for individualized investigation can improve computing system functionality, by reducing the risk that actual threats will not be detected.

SUMMARY

Some teachings herein were motivated by an initial technical challenge of formulating implementable and effective criteria for determining whether two users should be considered similar to one another when performing behavior analytics. Similar users normally behave similarly, so a user's departure from the behavior patterns of its peers may be reasonably considered an anomaly worthy of at least a second look, and perhaps deeper investigation. In this context, the inventors created automated cybersecurity peer identification tools and techniques which are suitable for efficiently and effectively scoring user similarity in production behavior analytics environments. Other technical challenges addressed by the innovations taught here will also be apparent to one of skill from the discussion provided below.

Some embodiments provide or use a cybersecurity peer identification (CPI) technology which obtains certain data through an identity directory application program interface (API), processes that data using an innovative algorithm, and submits resulting cybersecurity peer data to a cybersecurity peer-based functionality (CPBF) API for use in behavior analytics, resource management, or other technical capability enhancing purposes.

For instance, in some embodiments an executable cybersecurity peer identification code obtains definitions of security groups via the identity directory API. The security group definitions include security group identifiers and corresponding security group membership lists. Each membership list contains identifiers of user accounts of users of a guarded computing system (GCS) that are currently members of a respective security group. The CPI code uses this data to produce the cybersecurity peer data that is submitted to CPBF code.

In these examples, the GCS is guarded against cyberattacks, resource management inefficiencies, or both, using the CPI technology. In other words, the risk of such attacks or inefficiencies is lowered by suitably configured use of the CPI technology. Toward that end, in some embodiments, and for one or more pairs of user account identifiers, the CPI code computes a peerSimilarityScore value which represents a measurement of similarity of security permissions of the user accounts in the pair. The measurement of similarity is based at least in part on which security groups, if any, have both user accounts as members. Then the CPI code submits one or more pairs of user account identifiers and their respective peerSimilarityScore values to the CPBF API. By identifying and submitting pairs of user account identifiers and their respective current peerSimilarityScore values, the CPI technology provides contextual data for utilization by at least one of the following functionalities: CPBF which includes behavior analysis, CPBF which includes intrusion detection, CPBF which includes resource management, CPBF which includes user permissions management, or CPBF which includes user location management.

Some embodiments taught herein provide or use particular cybersecurity peer identification actions. Some automatically obtain definitions of security groups through an API, with the definitions including security group membership lists. Each membership list identifies one or more user accounts which are members of a respective security group. For one or more pairs of user account identifiers, these embodiments compute a peerSimilarityScore value which represents a measurement of similarity of security permissions of the user accounts in the pair. The measurement of similarity is based at least in part on which security groups, if any, have both user accounts of the pair as members. Then one or more pairs of user account identifiers and their respective peerSimilarityScore values are submitted for utilization as contextual data by cybersecurity peer-based functionality. To help avoid staleness, some embodiments repeat the obtaining, computing, and submitting at least once per updateInterval time period over the course of at least three consecutive updateInterval time periods. In some cases, the updateInterval represents a time period that is in a range of one day to one hundred days, e.g., one embodiment updates similarity scores once per week.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 3 is a block diagram illustrating some aspects of security group definitions;

FIG. 4 is a block diagram illustrating aspects of computing technology user accounts;

FIG. 5 is a block diagram illustrating some examples of user account environments;

FIG. 6 is a block diagram illustrating some examples of cybersecurity peer-based functionalities (CPBF), i.e., computing system functionalities which rely on, or at least benefit from, information about cybersecurity peers;

FIG. 10 is a block diagram illustrating some parameters that may be used for tuning performance aspects of CPI technology;

FIG. 11 is a flowchart illustrating steps in some CPI methods; and

DETAILED DESCRIPTION

Overview

Figure 1:
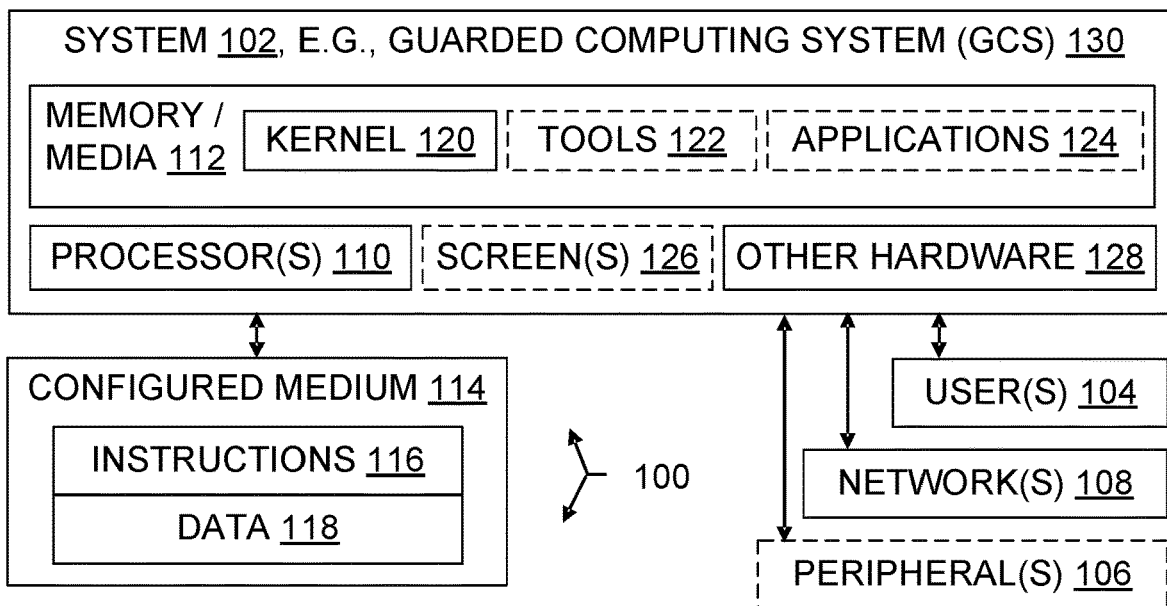
FIG. 1 is a block diagram illustrating computer systems generally and also illustrating configured storage media generally.
Figure 2:
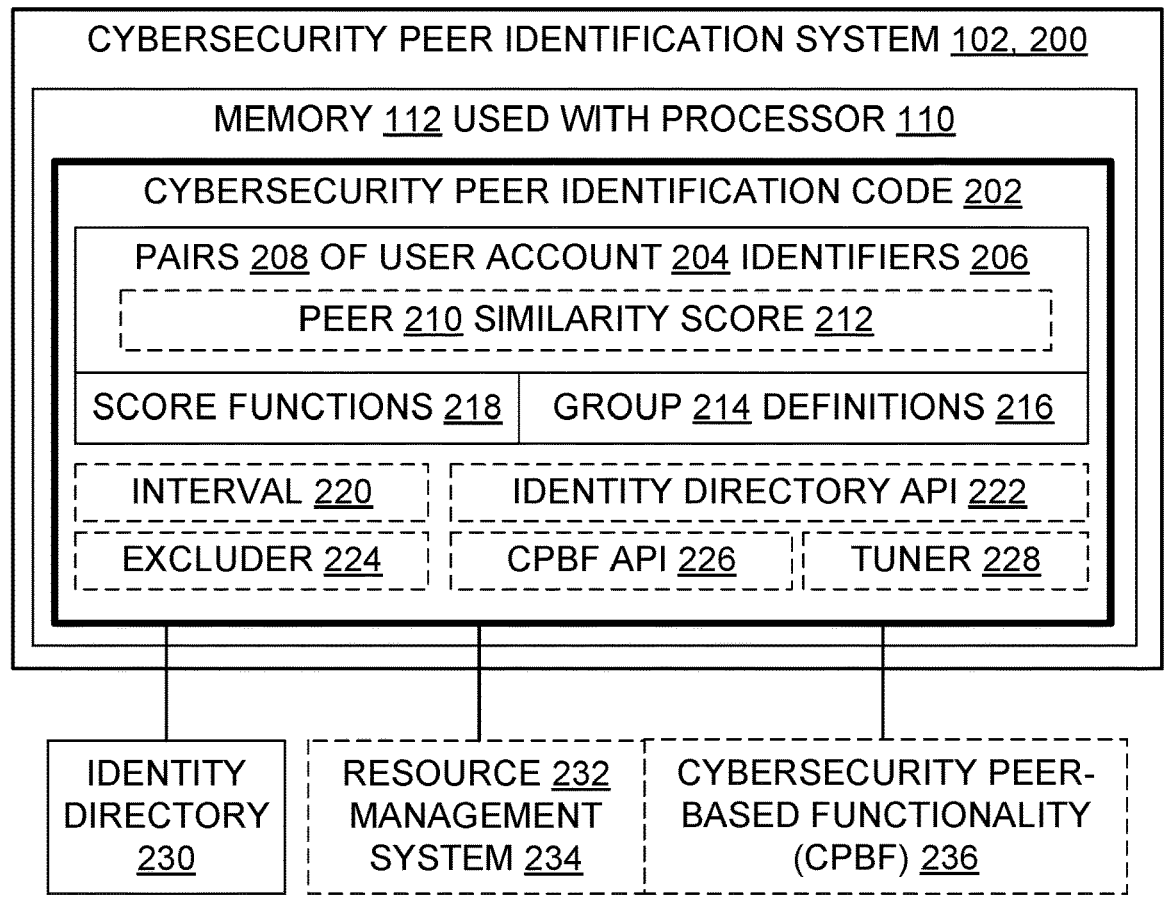
FIG. 2 is a block diagram illustrating some aspects of a cybersecurity peer identification (CPI) architecture.
Figure 7:
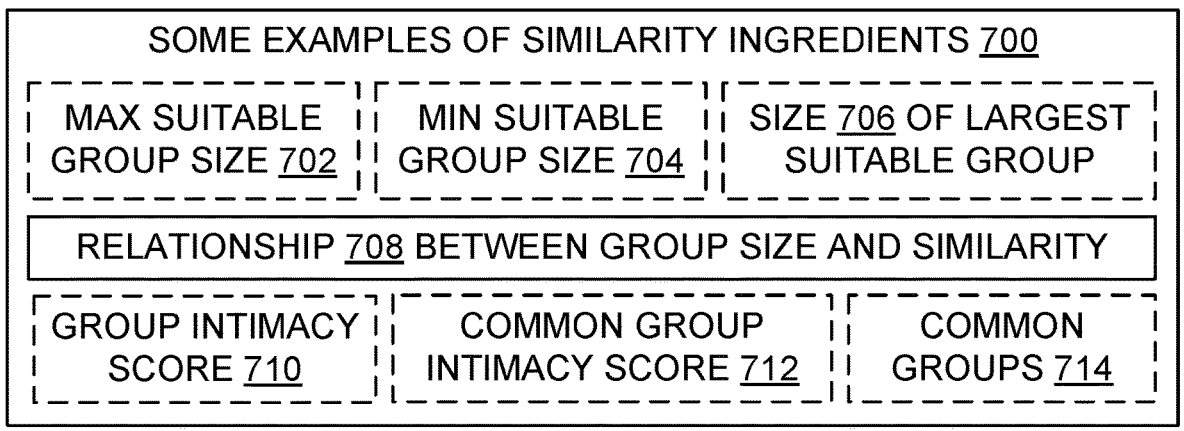
FIG. 7 is a block diagram illustrating some examples of various computational ingredients that may be used in similarity scoring activities, e.g., activities whose results represent an extent to which user accounts are deemed cybersecurity peers of one another.
Figure 8:
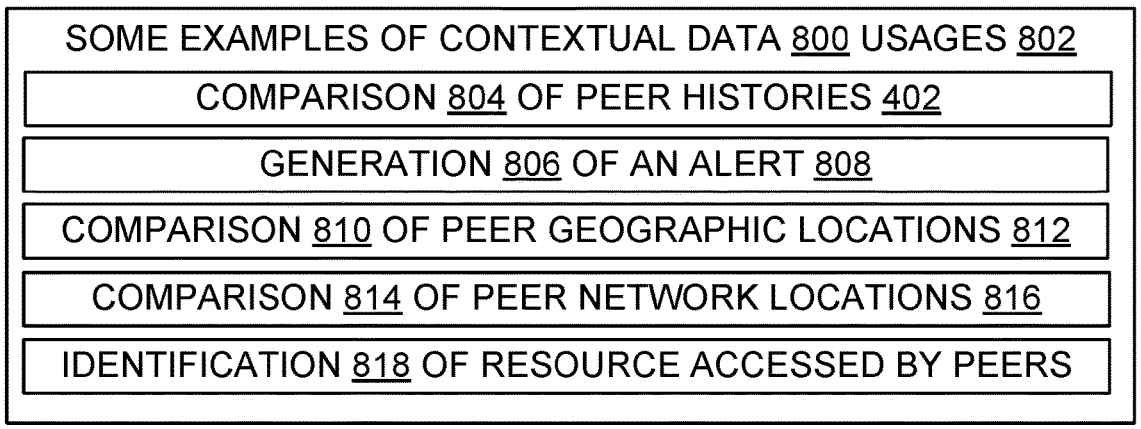
FIG. 8 is a block diagram illustrating some examples of usage of CPI data as contextual data.
Figure 9:
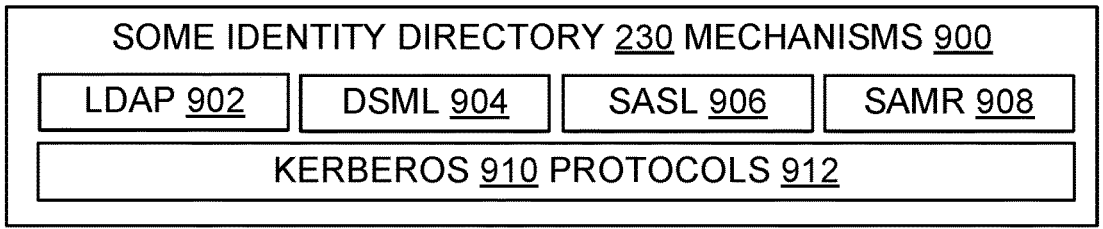
FIG. 9 is a block diagram illustrating some identity directory mechanisms, including some protocols used by or with identity directories.

Many innovations expand beyond their origins, but understanding an innovation's origins can help one more fully appreciate the innovation. In the present case, some teachings presented herein were motivated by a technical challenge of increasing the security of Microsoft Azure® cloud accounts against attacks (mark of Microsoft Corporation). An associated challenge was how to define the "likeness" of users in a way that permits useful behavior analytics, because behavior analytics like UBA and UEBA often presume that users who are alike will behave similarly unless something happens that increases cyber risk.

In particular, some teachings herein were motivated by an emergent technical challenge of how to utilize available information about user security permissions to formulate implementable and effective criteria for determining the extent to which two users should be considered similar to one another, at least for the purpose of behavior analytics. It is one thing to assert that users in a security context are expected to behave "like their peers". But it is something else to formulate and implement an effective, efficient, and scalable algorithm that computes peer "likeness" (a.k.a. peer "similarity") scores that are usable in practice by behavior analytics tools. Such algorithms are presented herein.

Some embodiments herein enhance (i.e., support or provide) behavior analytics. In pursuing better cybersecurity, knowing which users are peers makes it easier for behavior analytics to determine whether particular resource access activity is suspicious. When user u and users v1 . . . vn are cybersecurity peers to a sufficient level of similarity, and user u connects to a resource Y, then that connection activity is suspicious if there is no record indicating that one or more of the peers v1 . . . vn routinely connect to the same resource Y. On the other hand, if peers of u also access the resource Y, then the access is more likely benign. Accordingly, alerts can be generated for suspicious activity, and false positives can be reduced by avoiding alerts based on benign activity. Resource Y may be a database, a file, a server or other device, an IP address range, a port, a management API, a cloud service, an application, or any other computing system resource. The threshold for a sufficient level of similarity may be administrator-specified, or it may be a result of automatic tuning of a system, for example.

Some approaches to behavior analytics rely on an organizational tree to define peers, e.g., peers are users who belong to the same department or who report to the same manager. However, approaches based entirely on user location in an organizational chart fail to closely correlate actual security permissions with peer status.

By contrast, algorithms and other teachings presented herein identify computing technology security peers (a.k.a. cybersecurity peers) based on shared security permissions. In particular, some embodiments identify users u and v as peers based at least in part on which security groups have both u and v as members.

In a refinement, more weight is given to shared membership in smaller security groups. That is, if u1 and v1 are both members of a security group with fifty members, and u2 and v2 are both members of a security group with only ten members, then the peer score—the similarity score—for u2 and v2 will be greater (indicating more similarity) than the similarity score for u1 and v1.

In another refinement, the security group membership data that is used in similarity scoring is updated at regular intervals, e.g., weekly. Then similarity scores are recomputed and resubmitted to the behavior analysis tools (in some cases, scores are recomputed but resubmitted only if they have changed). This repeated updating approach contrasts with approaches that are based on a single read of an organizational chart, which will provide information that goes stale as weeks go by since the chart was read. Such updates may also be performed on demand (e.g., upon entry of a user command) in some embodiments.

As it happens, similarity measures that are useful for behavior analytics may also be used for non-security enhancements to computing systems. That is, cybersecurity peer similarity scores may also be used outside cybersecurity per se. Some examples of security peer score utilization include clustering or caching particular resources for more efficient access, and giving users who are security peers better communication support through technology or physical relocation.

Some embodiments described herein may be viewed by some people in a broader context. For instance, concepts such as alerts, grouping, permissions, resources, and similarity may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to score the similarity of two user accounts based on filesystem and other access permissions granted to those accounts. Other configured storage media, systems, and processes involving alerts, grouping, permissions, resources, or similarity are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular account environments, tools, contexts, identifiers, fields, properties, files, data structures, notations, control flows, pseudocode, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as grouping computer system user accounts according to the similarity of their respective permissions to access computing system resources, and detecting departures from the normal user behavior evident in computing system logs, which are activities deeply rooted in computing technology. Thus, purely mental processes are excluded. Some embodiments improve the functioning of computing systems by enhancing cybersecurity through the automatic detection of apparent, likely, or actual attacks, based on behavior analytics. Some detect an attack in sufficient time to disrupt the attack, mitigate harm from the attack, identify a source of the attack, or identify a user account as compromised promptly after it is breached by the attack. Some embodiments provide security peer scoring that is suitable for use in resource management, permissions management, or user location management. Other advantages based on the technical characteristics of the teachings will also be apparent to one of skill from the description provided.

Acronyms, Abbreviations, Names, and Symbols

Some acronyms, abbreviations, names, and symbols are defined below. Others are defined elsewhere herein, or do not require definition here in order to be understood by one of skill.

$\forall$: for all, for every
$\in$: element of, belongs to
$\subseteq$: contained in, subset of
$\leq$: less than or equal to
$\neq$: not equal to, does not equal
$\stackrel{\text{def}}{=}$: equal to by definition
<condition>: condition indicated
k|<condition>: item or value k such that condition is satisfied, item or value k for which condition is satisfied
|K|: size of K, cardinality of K, number of members in K
{<membership>}: set having membership indicated
$\rightarrow$: mapping
P×U: Cartesian product of sets P and U, set of all ordered pairs (p, u) where p belongs to set P and u belongs to set U m×n: product of m and n, m times n, m multiplied by n
[0,1]: real numbers from 0 to 1, also including 0 and including 1
ALU: arithmetic and logic unit
API: application program interface
ATP: Azure® Advanced Threat Protection (mark of Microsoft Corp.)
BIOS: basic input/output system
CD: compact disc
CGIS: common group intimacy sum
CPBF: cybersecurity peer-based functionalities
CPI: cybersecurity peer identification
CPU: central processing unit
DSML: directory services markup language
DVD: digital versatile disk or digital video disc
FPGA: field-programmable gate array
FPU: floating point processing unit
GCS: guarded computing system
GPU: graphical processing unit
GUI: graphical user interface
IDS: intrusion detection system, may be or include an HIDS (host-based IDS) or an NIDS (network-based IDS), for example
IaaS or IAAS: infrastructure-as-a-service
IoT: internet of things
IP: internet protocol
LAN: local area network
LDAP: lightweight directory access protocol
log: logarithm
NTLM: NT Lan Manager, where NT denotes Microsoft New Technology products
OS: operating system
PaaS or PAAS: platform-as-a-service
PGIS: parent group intimacy sum
RAM: random access memory
ROM: read only memory
SAMR: security account manager remote protocol
SASL: simple authentication and security layer
UBA: user behavior analytics
UEBA: user and entity behavior analytics
UEFI: Unified Extensible Firmware Interface
VM: virtual machine
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering in a cloud computing environment or other network or computing system environment.

"Cloud" means pooled resources for computing, storage, and networking which are elastically available for measured on-demand service. A cloud may be private, public, community, or a hybrid, and cloud services may be offered in the form of infrastructure as a service, platform as a service, software as a service, or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as automatically obtaining definitions of security groups through an API, computing similarity scores, calling similarity functions, filtering out security groups based on their size, performing behavior analytics in a production environment, calculating logarithms, calculating reciprocals of powers, and submitting scores trough an API, are understood herein as inherently digital. A human mind cannot interface directly with a CPU or other processor, or with RAM or other digital storage, to read and write the necessary data to perform the cybersecurity peer identification or CPBF steps taught herein. This would all be well understood by persons of skill in the art in view of the present disclosure, but others may sometimes need to be informed or reminded of the facts. Unless stated otherwise, embodiments are presumed to be capable of operating at production scale in commercial production environments when properly configured and supplied with data, or in testing labs for production environments, as opposed to being mere thought experiments. "Production scale" means operating with security group data from an identity directory having at least fifty user accounts, or computing at least one hundred peer similarity scores within two minutes of real world clock time from obtained security group data, or both.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as alerting, applying, calculating, comparing, computing, detecting, determining, distinguishing, enhancing, excluding, executing, filtering, finding, generating, identifying, implementing, listing, obtaining, performing, providing, repeating at an interval, scoring, selecting, submitting, tuning, using, utilizing, varying (and alerts, alerted, applies, applied, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally, including, e.g., LANs, WANs, software defined networks, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems (IDS), intrusion prevention systems (IPS), debuggers, profilers, compilers, interpreters, static code analysis tools, software development tools and tool suites, hardware development tools and tool suites, diagnostics
124 applications, e.g., word processors, web browsers, spreadsheets, games, email tools
126 display screens, also referred to as "displays"
128 computing hardware not otherwise associated with a reference number 106, 108, 110, 112, 114
130 guarded computing system
200 cybersecurity peer identification system; may also be referred to as "CPI system" or "security peer identification system"
202 cybersecurity peer identification code; may also be referred to as "CPI code" or "security peer identification code"
204 user account
206 user account identifier; may be implemented as a string, a hash value, a pointer, an index into a table of identifiers, a handle, a globally unique identifier (GUID), or another value that identifies a user account to a kernel or to cybersecurity software or both
208 pair of user account identifiers; may also be referred to as a "pair of users" on the assumption (which is not a universal or inherent or implicit requirement) that users and user accounts correspond 1-to-1 in a given example; as used herein, "pair" means a tuple having at least two constituent items 210 cybersecurity peer; may also be referred to as "security peer" or simply as "peer"
212 similarity score for two or more peers 210
214 security group
216 security group definition
218 score functions, i.e., functions or other routines executed when computing a similarity score 212
220 time interval, time period
222 identity directory API
224 excluder code, a.k.a. filer code
226 CPBF API
228 tuner code; also refers to action of tuning
230 identity directory, i.e., a database, repository, or other directory of user account identity and authorization information; may be distributed among multiple files or multiple machines or both
232 resource, e.g., a database, a file, a server or other device, an IP address range, a port, a management API, a cloud service, an application, or any other computing system resource
234 resource management system
236 CPBF generally; also refers to code that provides CPBF
300 aspects of security group definitions
302 security group identifier; may be implemented as a string, a hash value, a pointer, an index into a table of identifiers, a handle, a globally unique identifier (GUID), or another value that identifies a security group to a kernel or to cybersecurity software or both
304 security group membership list
400 aspects of user accounts
402 history of user account activities, e.g., log, event set
404 user account activities, especially access attempts and results
406 security permissions
502 public cloud; also refers to public cloud as an account activity environment
504 private cloud; also refers to private cloud as an account activity environment
506 hybrid cloud; also refers to hybrid cloud as an account activity environment; clouds 502, 504, 506 and otherwise are examples of networks 108; cloud; a "cloud" may also be referred to as a "cloud environment" or a "cloud computing environment"
508 private network; also refers to private network as an account activity environment; private networks are an example of a network 108
600 examples of CPBF
602 intrusion prevention system (IPS) or intrusion detection system (IDS)
604 access attempt behavior analyzer or behavior analysis functionality; also referred to as "behavior analyzer" or "behavior analytics"; also refers to code implementing behavior analytics
606 resource management functionality; resource management system 102, 234 is an example
608 user permissions management functionality
610 user location management functionality
700 ingredients used in some embodiments when determining extent of similarity; some embodiments do not make only a binary classification of peer or nonpeer but instead measure a similarity distance having multiple values in a range (e.g., 0 . . . 1)
702 maximum suitable group size; groups larger than this cutoff size are filtered out a.k.a. excluded 704 minimum suitable group size; groups smaller than this cutoff size are filtered out a.k.a. excluded; this is 2 unless otherwise indicated—singletons and empty groups are excluded 706 size of largest suitable (i.e., non-excluded) group remaining after filtering out groups that are too large or too small to qualify as suitable 708 relationship between group size and similarity; the nature of this relationship indicates how the group size of groups containing u and v qualitatively impacts the similarity score of u and v 710 group intimacy score; defined by formulas or examples or both herein 712 common group intimacy score; defined by formulas or examples or both herein 714 common groups; "common" is used herein in the sense of "shared", "having in common", not in the sense of "routine" or "frequently encountered"

800 contextual data, e.g., security peer identifications (in embodiments where peer or nonpeer are the scores 212), or security peer identifications plus corresponding similarity extent scores 212 in a range such as [0, 1] (i.e., 0 . . . 1)

802 usages of contextual data, a.k.a. utilizations of contextual data 804 comparison of peer activity histories 806 generation of an alert 808 cybersecurity alert 810 comparison of peer geographic locations 812 geographic locations 814 comparison of peer network locations 816 network locations, e.g., IP address, trust domain, data center, etc.

818 identification of a resource shared (not necessarily concurrently) by multiple user accounts 900 mechanisms used in or by an identity directory, e.g., protocols and their implementing executable code, and data communicated per the protocols 902 LDAP (lightweight directory access protocol); also refers to data and executable code which implements LDAP 904 DSML (directory services markup language) also refers to data and executable code which implements DSML 906 SASL (simple authentication and security layer) also refers to data and executable code which implements SASL 908 SAMR (security account manager remote protocol) also refers to data and executable code which implements SAMR 910 Kerberos; also refers to data and executable code which implements Kerberos 912 protocol generally 1000 parameters for tuning performance (especially execution speed, false positives) of a CPI system 1002 number N of closest peers that is submitted, retained, or both; N may be a maximum or a minimum, depending on the embodiment 1004 constants used in computing a similarity score 1100 flowchart; 1100 also refers to cybersecurity peer identification methods illustrated by or consistent with the FIG. 11 flowchart 1102 obtain security group definitions 1104 filter out (i.e., exclude from use in CPI) security groups that are too large or too small 1106 computer peer similarity scores (e.g., in a normalized range 0 . . . 1, or as a yes/no peer/nonpeer classification)

Figure 12:
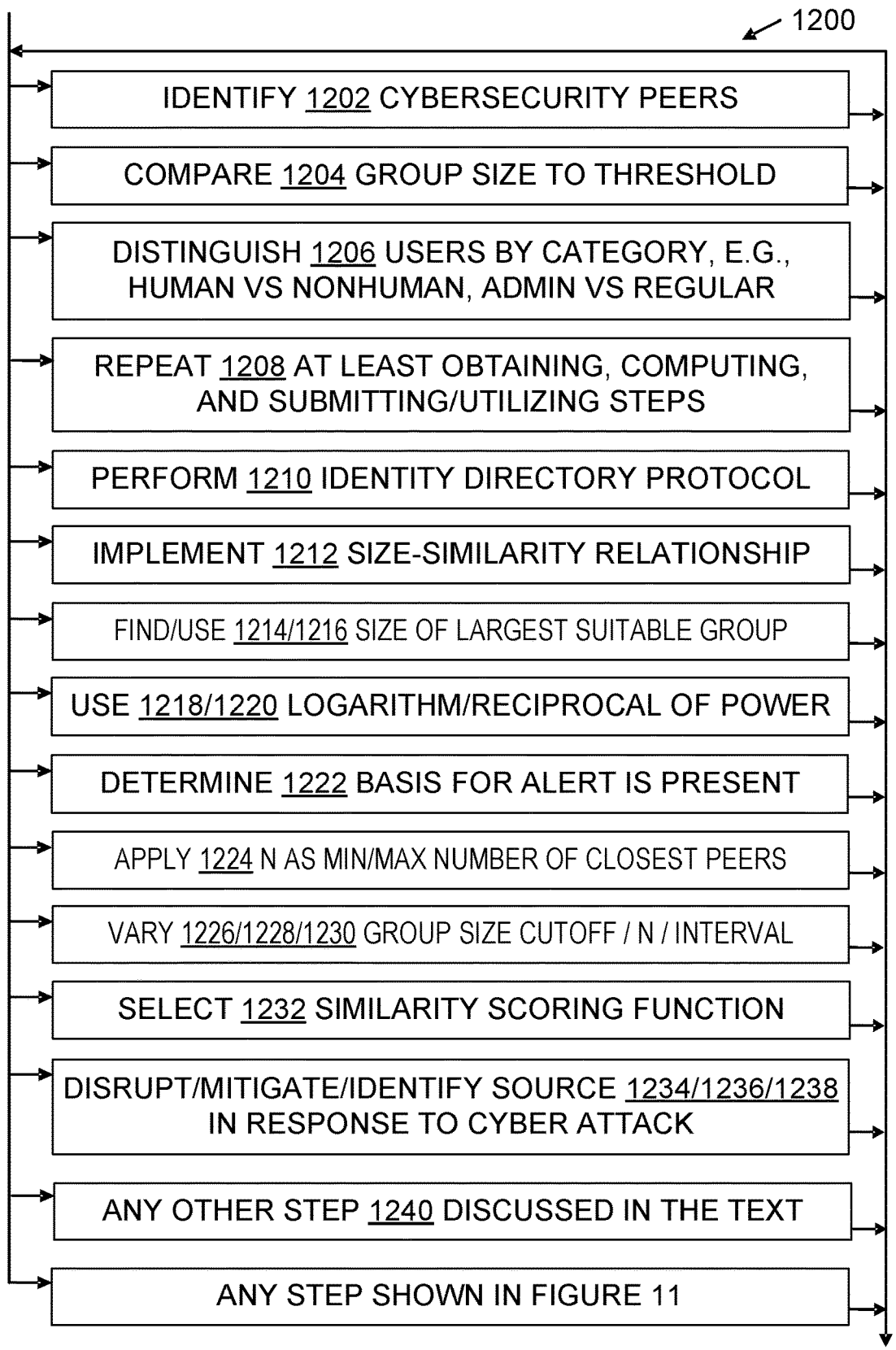
FIG. 12 is a flowchart further illustrating steps in some CPI methods.

1108 submit peer identifications and corresponding classification or other score 212 for subsequent CPBF processing 1110 utilize peer identifications and corresponding classification or other score 212 in subsequent CPBF processing 1112 perform CPBF processing 1114 enhance system cybersecurity or efficiency or both 1200 flowchart; 1200 also refers to cybersecurity peer identification methods illustrated by or consistent with the FIG. 12 flowchart (which incorporates the FIG. 11 flowchart)

1202 identify cybersecurity peers 1204 compare security group size to a cutoff threshold 702 or 704

1206 distinguish users by category, e.g., distinguish between human users and users which are devices or software or software processes or other computing system components; may also distinguish between administrative or other highly privileged accounts (users) and regular or otherwise lower privileged accounts (users)

1208 repeat specified steps at stated intervals 1210 perform an LDAP protocol or other identity directory protocol 1212 implement a group size—similarity score relationship 708

1214 find size 706 of largest remaining (or largest regardless if no exclusion) security group 1216 use size 706 of largest security group 1218 use a logarithm function in computation of similarity score 1220 use a reciprocal power function (e.g., negative exponent) in computation of similarity score 1222 determine that a basis for an alert is present 1224 apply a value of tuning parameter N 1002

1226 vary group size cutoff 702 or 704

1228 vary tuning parameter N 1002

1230 vary update interval 220

1232 select a similarity scoring function 1234 disrupt a cyberattack, e.g., by reducing or eliminating additional access attempts by a user whose behavior is suspicious by closing ports, discarding or quarantining packets, or changing account credentials 1236 mitigate harm caused by a cyberattack, e.g., by resetting credentials of compromised accounts whose credentials were changed by an attacker and thus restoring access to the authorized user, or by restoring data that was altered or deleted after an account was breached 1238 identify a source of a cyberattack, e.g., by determining the IP address or domain or user account from which unauthorized access attempts arrive at a guarded computing system 1240 any step discussed in the present disclosure that has not been assigned some other reference numeral Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

With reference to FIGS. 1 through 10, some embodiments use or provide a cybersecurity peer identification (CPI) system 200 for a guarded computing system (GCS) 130. The GCS may be any computing system 102 having a plurality of user accounts 204 which have respective user account identifiers 206. The CPI system 200 in this example includes a processor 110, and a memory 112 in operational communication with the processor, and other components as discussed herein, such as CPI code 202 and its components.

The CPI system 200 may be functionally part of a larger system 102 which also includes an identity directory 230 and cybersecurity peer-based functionality (CPBF) 236 such as a behavior analyzer 604. The analyzer 604 utilizes execution of the processor 110 to analyze user activities 404 in view of peer similarities 212 to identify suspicious access events. Other utilizations than behavior analytics 604 are also possible, as discussed below.

Some embodiments use or provide a cybersecurity peer identification system 200 which includes a processor 110, a memory 112 in operable communication with the processor, an identity directory API 222, a cybersecurity peer-based functionality (CPBF) API 226, and a cybersecurity peer identification code 202. Upon execution with the processor 110, the CPI code 202 performs operations that include obtaining definitions 216 of security groups 214 via the identity directory API 222. The security group definitions include security group identifiers 302 and corresponding security group membership lists 304. Each membership list 304 lists identifiers 206 of user accounts 204 of users 104 of a guarded computing system 130 that are currently members of a respective security group 214.

This example of the CPI code 202 also performs operations that include computing, for one or more pairs 208 of user account identifiers 206, a peerSimilarityScore value 212 which represents a measurement of similarity of security permissions 406 of the user accounts in the pair. The measurement of similarity is based at least in part on which security groups 214, if any, have both user accounts of the pair as members.

This example of the CPI code 202 also performs operations that include submitting one or more pairs 208 of user account identifiers 206 and their respective peerSimilarityScore values 212 to the CPBF API 226.

The similarity scores 212 submitted may be explicit, e.g., by submitting data 800 of the form:
(u1, u2, 0.6)
(u1, u3, 0.7)
(u1, u4, 0.2)
where u1, u2, u3, u4 are user account identifiers 206 and the values 0.6, 0.7, 0.2 are similarity scores 212.

The similarity scores 212 may be alternately be implicit in submitted data when a peer/nonpeer scoring is used. For instance, scores 212 may be conveyed implicitly when submitting data 800 of the form:
(u1, u2)
(u1, u3)
Scores 212 are also implicit in data tuples 800 of the form:
(u1, u2, u3)
In either case, peers of u1 include u2 and u3, since u2 and u3 are sufficiently similar to u1, e.g., their raw scores were above a 0.5 cutoff. Of course, one of skill will recognize that the contextual data 800 produced by CPI system 200 may also be formatted in many other different ways and still be consistent with teachings presented herein.

Behavior analytics 604 are a motivating example, but not the only potential utilization of CPI contextual data 800. In some embodiments, the CPI system 200 identifies and submits pairs 208 of user account identifiers 206 and (implicitly or explicitly) submits their respective current peerSimilarityScore values 212. This submission may provide contextual data 800 for utilization by at least one of the following functionalities 236:
CPBF which includes behavior analysis 604,
CPBF which includes intrusion detection 602,
CPBF which includes resource management 606,
CPBF which includes user permissions management 608, or
CPBF which includes user location management 610.

For example, behavior analysis 604 may utilize peer information 800 to help assess whether a user account's activities depart suspiciously from the activities of that user account's peers.

Resource management 606 may utilize peer information 800 to help identify resources 232 that are frequently accessed by a set of peers 210. Resource management 606 may then recommend, or perform, operations such as caching, or advance downloading, or replication of the resource, in order to reduce access times for the peers.

User permissions management 608 may utilize peer information 800 to help identify situations in which a user u is a peer of several other users but is not accessing a particular resource 232 that is frequently accessed by those peers. These circumstances may indicate that the user u's security permissions 406 are overprovisioned, in the sense that u has permission to access a resource 232 that u does not actually need to access to perform u's normal work duties.

User permissions management 608 may also utilize peer information 800 to help identify situations in which a low privilege account has been added to a high privilege group. Since high privilege accounts are sometimes subject to more intense and frequent logging and other security measures than low privilege accounts, creating this situation can reduce an attacker's visibility and hence reduce the attacker's risk of being detected or even detected and caught, while still providing the attacker with a high level of unauthorized privilege.

User location management 610 may utilize peer information 800 to help identify situations in which user u and v are peers but are further apart (geographically, or in a network distance such as latency or hops) from one another than other pairs of peers. User location management 610 may then recommend operations such as changes in network topology, addition of communication lines, or even physical relocation, to make it easier for u and v to efficiently communicate with one another. Of course, changes would not be made unless improved communication between u and v would actually be beneficial; u and v might be security peers whose current communication levels and channels with each other are sufficient.

In some embodiments, the CPI system 200 is further characterized by at least one of the following characteristics: the user account identifiers 206 identify accounts in a public cloud GCS 502, 130; the user account identifiers 206 identify accounts in a hybrid cloud GCS 506, 130; or the user account identifiers 206 identify accounts in a network GCS 508, 130 which is private in the sense that it communicates with the internet via a security mechanism such as a firewall ora proxy server.

In some embodiments, the cybersecurity peer identification system 200 further includes a maxSuitableGroupSize threshold 702 having a value greater than nine (for example). A code 202 upon execution compares respective sizes of security groups to maxSuitableGroupSize, and a code 202 upon execution excludes from computation of peerSimilarityScore values 212 any security groups 214 that have more than maxSuitableGroupSize user accounts as members.

In some embodiments, the cybersecurity peer identification code 202 upon execution excludes from computation of peerSimilarityScore values any security groups that have less than two user accounts as members. In this case, two is an example of a minSuitableGroupSize 704.

In some embodiments, the identity directory API 222 includes code which upon execution performs lightweight directory access protocol 902 operations. In some, other identity directory protocols 900 are performed.

In some embodiments, the security group definitions 216 reside in the memory 112, and the users 104 of user accounts 204 that are identified in those security group definitions 216 include at least nonhuman users. Unexpected presence of human users in a group of otherwise nonhuman users, or vice versa, may be suspicious. For instance, a human user u in a security group 214 otherwise consisting of printer devices 102 suggests three possibilities: u is an authorized administrator of those printers, the security group was misconfigured, or u was created by an unauthorized intruder or unauthorized insider as part of a cyberattack.

In some embodiments, the CPI system 200 includes an updateInterval 220 variable or constant which represents a time period that is in a range, e.g., of one day to six months. The cybersecurity peer identification code 202 includes code which is configured to upon execution repeat the obtaining, computing, and submitting operations at least once per updateInterval time period over the course of at least three consecutive updateInterval time periods, for example. This repetitive updating helps prevent the CPBF 236 from using stale security peer data 800.

In some embodiments, the cybersecurity peer identification code 202 upon execution implements a nonlinear relationship 708 between security group sizes and peerSimilarityScore values. Thus, smaller security groups 214 make larger contributions to peerSimilarityScore values 212 than larger security groups make to peerSimilarityScore values.

Embodiments described herein may be part of a defense in depth approach to cybersecurity. Embodiments are generally compatible with other security mechanisms. In particular, using embodiments taught herein does not necessarily prevent or inhibit usage of different tools or techniques for reducing cyberattack impact, e.g., multifactor authentication, good password hygiene, signature-based intrusion detection, separation of duties, and so on. Multiple security tools and techniques may be combined, e.g., in an offering such as Microsoft's Azure® ATP (Advanced Threat Protection) solution (mark of Microsoft Corporation).

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different Figures may be combined into fewer items or into a single item, items may be renamed, or items may be connected differently to one another.

Examples are provided herein to help illustrate aspects of the technology, but the examples given within this document do not describe all of the possible embodiments. Embodiments are not limited to the specific configurations, implementations, arrangements, displays, features, approaches, or scenarios provided herein. A given embodiment may include additional or different technical features, mechanisms, sequences, data structures, or functionalities for instance, and may otherwise depart from the examples provided herein.

Processes (a.k.a. Methods)

FIG. 11 illustrates an example method 1100 (a.k.a. process) for identifying security peers. FIG. 12 further illustrates security peer identification methods, including refinements, supplements, or contextual actions for steps shown in FIG. 11. Technical processes shown in the Figures or otherwise disclosed will be performed automatically, e.g., by a CPI system 200, unless otherwise indicated. Processes may also be performed in part automatically and in part manually to the extent action by a human administrator or other human person is implicated, e.g., in some embodiments a person may enter a command to tune a CPI parameter 1000. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 11 and 12. Steps may be performed serially, in a partially overlapping manner, or fully in parallel. In particular, the order in which flowchart 1100 action items or flowchart 1200 action items are traversed to indicate the steps performed during a process may vary from one performance of the process to another performance of the process. The traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a cybersecurity peer identification method, including automatically obtaining 1102 definitions of security groups, computing 1106 a peerSimilarityScore value, and submitting 1108 contextual data 800. The security group definitions include security group membership lists, with each membership list identifying one or more user accounts which are members of a respective security group. Computing 1106 occurs for one or more pairs of user account identifiers. Computing 1106 produces a peerSimilarityScore value which represents a measurement of similarity of security permissions of the user accounts in the pair. The measurement of similarity is based at least in part on which security groups, if any, have both user accounts of the pair as members. Submitting 1108 submits one or more pairs of user account identifiers and their respective peerSimilarityScore values for utilization 1110 as contextual data 800 by cybersecurity peer-based functionality. Some embodiments repeat 1208 the obtaining 1102, computing 1106, and submitting 1108 at least once per updateInterval time period over the course of at least three consecutive updateInterval time periods, where updateInterval represents a time period that is in a range of one day to one hundred days.

Some embodiments filter out 1104 security groups whose number of member user accounts is greater than a predetermined maxSuitableGroupSize threshold, thereby avoiding use of those filtered out security groups when computing peerSimilarityScore values. Some filter out 1104 security groups whose number of member user accounts is less than a predetermined minSuitableGroupSize threshold, thereby avoiding use of those filtered out security groups when computing peerSimilarityScore values.

In some embodiments, the method implements 1212 a relationship between security group sizes and peerSimilarityScore values whereby a security group G1 makes a larger contribution to a peerSimilarityScore value than a security group G2 when G1 has fewer members than G2.

In some embodiments, computing 1106 a peerSimilarityScore value includes finding 1214 a maxGroupSize which is the size of the largest security group that will be used in computing the peerSimilarityScore value, and calculating 1216, 1218 a logarithm whose base depends on maxGroupSize.

In some embodiments, computing 1106 a peerSimilarityScore value includes calculating 1220 a reciprocal of a power of a value which is based on a security group's number of members.

In some embodiments, the submitted contextual data 800 identifies a user account u and a user account v as cybersecurity peers, and the method further includes at least one of the following: comparing 804 activity in user account u with activity in user account v; generating 806 an alert in response to determining that an activity X is found in a history of user account u but is not found in a history of user account v; generating 806 an alert in response to determining that user account u has fewer privileges than user account v; generating 806 an alert in response to determining that user account u has a human user and user account v has a nonhuman user; or generating 806 an alert in response to detecting instability of a set of cybersecurity peers of user account u. Peer set instability detection may be detected, e.g., based on deviation from an average number of peers or from an average number of peer changes over time.

In some embodiments, the submitted contextual data 800 identifies a user account u and a user account v as cybersecurity peers, and the method further includes at least one of the following: comparing 810 a geographic location of a user of user account u with a geographic location of a user of user account v; comparing 814 a network location of a resource accessed by user account u with a network location of a resource accessed by user account v; or identifying 818 a resource that was accessed by both user account u and user account v.

In some embodiments, the obtaining 1102 or another part of the method utilizes 1210 at least one of the following: LDAP (lightweight directory access protocol), DSML (directory services markup language), SASL (simple authentication and security layer), SAMR (security account manager remote protocol), or a Kerberos protocol.

In some embodiments, the submitting 1108 submits for each user account u of a plurality of user accounts at least the N 1002 closest cybersecurity peers of user account u based on pairwise peerSimilarityScore values, where N is in a range of 3 to 20. If a user u has no security peers, investigation is likely prudent.

Some embodiments include tuning 228 an implementation of the method by varying 1226 a maxGroupSize which is the size of the largest security group that will be used in computing the peerSimilarityScore value. The varying 1226 may be based at least in part on how many false positive security alerts are produced using user account identifiers and their respective peerSimilarityScore values.

Some embodiments include tuning 228 an implementation of the method by varying 1228 a value N which limits how many of the closest cybersecurity peers of a user account u are utilized as contextual data by cybersecurity peer-based functionality, where closeness is based on u's peerSimilarityScore values. The varying 228 may be based at least in part on how many other user accounts have resource accesses accessing resources accessed by u.

Some embodiments include tuning 228 an implementation of the method by varying 1230 the updateInterval time period. The varying 1230 may be based at least in part on historic data representing at least one of the following: personnel hiring, personnel firing, personnel reassignments, project management activities, or human resources data. Some embodiments tune 228 using a combination of two or more kinds of varying, including varying 1226 a maxGroupSize, varying 1228 N, varying 1230 updateInterval, or varying constants 1004 used in computing 1106 similarity scores 212.

Some embodiments perform the method at a production scale, where "production scale" is defined as doing at least one of the following within a single updateInterval time period: obtaining 1102 membership lists which collectively identify at least fifty user accounts, or computing 1106 at least one thousand peerSimilarityScore values for respective pairs of user account identifiers. Other definitions of "production scale" may be applied in other embodiments.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as CPI code 202, score functions 218, similarity scores 212, security group definitions 216, APIs 222 and 226, and contextual data 800, in the form of data 118 and instructions 116, read from a removable storage medium 114 and/or another source such as a network connection, to form a configured storage medium. The configured storage medium 112 is capable of causing a computer system 200 to perform technical process steps for security peer identification or contextual data utilization, as disclosed herein. The Figures thus help illustrate configured storage media embodiments and process (a.k.a. method) embodiments, as well as system and process embodiments. In particular, any of the process steps illustrated in FIG. 11 or 12, or otherwise taught herein, may be used to help configure a storage medium to form a configured storage medium embodiment.

Some embodiments use or provide a storage medium 112, 114 configured with code which upon execution by one or more processors performs a cybersecurity peer identification method, including: obtaining 1102 definitions of security groups, the definitions including security group membership lists, each membership list identifying user accounts which are members of a respective security group; for one or more pairs of user account identifiers, computing 1106 a peerSimilarityScore value which represents a measurement of similarity of security permissions of the user accounts in the pair, the measurement of similarity based at least in part on which security groups, if any, have both user accounts of the pair as members, the computing implementing 1212 a nonlinear relationship between security group sizes and peerSimilarityScore values whereby smaller security groups make larger contributions to peerSimilarityScore values than larger security groups make to peerSimilarityScore values; submitting 1108 pairs of user account identifiers and their respective peerSimilarityScore values for utilization 1110 as contextual data by a cybersecurity peer-based functionality; and repeating 1208 the obtaining 1102, computing 1106, and submitting 1108 at least once per updateInterval time period over the course of at least three consecutive updateInterval time periods, where updateInterval represents a time period in a range of one day to sixty days.

Some embodiments include code for filtering out 1104 security groups whose number of member user accounts is greater than a predetermined maxSuitableGroupSize threshold, thereby avoiding use of those filtered out security groups when computing peerSimilarityScore values, where maxSuitableGroupSize is at least fifty.

Some embodiments include code for computing 1106 a peerSimilarityScore value in part by finding 1214 a maxGroupSize which is the size of the largest security group that will be used in computing the peerSimilarityScore value, and may also include code for calculating a logarithm whose base depends on maxGroupSize. Some include code for computing 1106 a peerSimilarityScore value in part by calculating 1220 a reciprocal of a power of a value which is based on a security group's number of members.

Some embodiments include code for submitting 1108 for each user account u only the N closest cybersecurity peers of user account u based on pairwise peerSimilarityScore values, where N is in a range of 5 to 25.

In some embodiments, the method tunes 228 performance by at least one of the following: varying 1226 a maxGroupSize which is the size of the largest security group that will be used in computing the peerSimilarityScore value; varying 1228 a value N which limits how many of the closest cybersecurity peers of a user account u are submitted; varying 1230 the updateInterval time period; or selecting 1232 between functions 218 for computing 1106 the peerSimilarityScore value.

Additional Examples and Observations

One of skill will recognize that not every part of this disclosure, or any particular details therein, are necessarily required to satisfy legal criteria such as enablement, written description, or best mode. Also, embodiments are not limited to the particular parameters, range endpoints, networks, tools, identifiers, fields, data structures, functions, constants, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments use or provide dynamic security group peer calculation for behavioral analytics using Microsoft Active Directory® solutions, or other identity directory solutions. For instance, an embodiment using Microsoft Azure® ATP may have a sensor installed on the Active Directory® solution, which will harvest the security group memberships. But teachings herein are not limited to the use of any particular identity directory or any particular source of identity directory solutions.

In some situations, users in an environment subject to cybersecurity are expected to behave like their peers. Some embodiments discover these peers by looking at common security group memberships, and the groups' relative size, and use this information to infer expected behavior. User actions viewed from a cybersecurity perspective may seem abnormal when peer activity is not considered as context. Often a user's history provides enough context to derive expected actions, but many actions do not fit this category. An additional context, other than the user's own context, allows analysis to understand that certain actions are legitimate. Without that additional context, many legitimate user actions are considered abnormal, giving rise to false positive alerts, and it becomes difficult or impractical to pinpoint the most important actions to investigate.

An Example with Specific Score Functions

Following is a detailed example for a CPI code 202 implementation to generate 1202 similar users 104, peers 210, of a security principal, user, in an environment 100 involving communications over computer networks 108, e.g., a cyber space.

Let U denote a set of unique user ids 206 in some organization synced to an Active Directory® solution. Let u denote a user in U, u∈U. A goal is to compute 1106 u's N most similar peer ids, $\{p_{u,i}\}_{i=1}^{N} \subseteq P$, and their corresponding similarity measurement S: P×U→[0,1].

Assume the following previous knowledge from the Active Directory® database: A mapping Members: G→M⊆U where G is the set of security groups 214 in the organization and M is the set of users who are members of G.

First, remove the groups containing more than one hundred members (in this example the max suitable group size 702 is one hundred). These groups are considered too big to infer similarity from. In Active Directory® environments, an example built-in group which is often too big to be suitable for inferring similarity is the group Domain Users. Assume that after these big groups are filtered out 1104, the CPI code 202 is left with K⊆G groups where |K|>1.

Second, the CPI code 202 calculates the size 706 of the largest group in K:

$$\text{i.e. } maxGroupSize = \max(\{|k_i|\}_{i=1}^{K}) \text{ where } k \in K. \quad (1)$$

Instead of maxGroupSize, the CPI code 202 could use maxSuitableGroupSize 702, or the number of users in an organization or an organization unit (OU), or the number of active users in an organization or an OU, or some other value larger than most sufficiently intimate groups, as a reference point.

In formula (1), maxGroupSize is an example of the size 706 of the largest suitable (i.e., non-excluded) group.

Next, the CPI code 202 goes over all groups in K and for each group k it calculates a group intimacy score 710, which is a measure between 0 to 1 indicating the "intimacy" of the group. The smaller the group, the higher this intimacy score is. The CPI code 202 calculates the intimacy of the group as follows:

$$I(k) = 1 - 0.99 \times \log_{maxGroupSize} |k| \text{ where } |k| \text{ is the member count of group } k. \quad (2)$$

In formula (2), the constant 0.99 is a tunable constant 1004. It could be varied by using 0.9, or 0.999, or 0.5, or another value greater than zero and less than one.

Also, the function I(k) in formula (2) is an example of a score function 218 which uses 1218 a logarithm. In a variation, the logarithmic portion could be replaced in a score function 218 which uses 1220 a reciprocal power of |k| such as $|k|^{-2}$, (i.e., one over the square of the member count of group k), or another negative exponent such as −3, and so on. One of skill will recognize that other calculations can also be used to implement a relationship 708 whereby smaller groups 214 in common contribute more to peer similarity 212 than larger groups.

Then for every user u∈U the CPI code 202 sums the intimacy scores of the parent groups, thus creating a mapping:

$$\text{parentGroupIntimacySum}(u) = \Sigma_{k|u \in \text{Members}(k)} I(k)$$
$$\overset{\text{def}}{=} \text{PGIS}(u) \quad (3)$$

Then for every two different users u,v∈U where u≠v the CPI code 202 goes over their joint 714 parent groups and sums the common intimacy to calculate a common group intimacy value 712:

$$\text{commonGroupIntimacySum}(u,v) = \Sigma_{k|u,v \in \text{Members}(k)} I(k)$$
$$\overset{\text{def}}{=} \text{CGIS}(u,v) \quad (4)$$

Note that CGIS(u,v)≤PGIS(u) and CGIS(u,v)≤PGIS(v) for all u, v different users in U.

Lastly, for every user the CPI code 202 calculates the peerSimilarityScore for every other user in U if they share at least one common group, using this formula:

$$\text{peerSimilarityScore}(u, v) = \frac{CGIS(u, v)}{PGIS(u) + PGIS(v) - CGIS(u, v)} \quad (5)$$

It can be shown that $$0 \le \text{peerSimilarityScore}(u, v) \le 1 \forall u, v \in U \quad (6)$$

Finally, the CPI code 202 assigns a peer similarity score for every pair of users, while keeping the top N peers for each user. The CPI code 202 repeats 1208 this calculation once a week to sync group membership changes that naturally occur in the organization. This data 800 is later used to extrapolate expected user actions in the cyber space, and thence to impact a user risk score.

The user risk score indicates an investigation priority, such as an indication of how urgent it is to investigate a specific user, based on related security alerts and abnormal activities combined with the user's impact from the last seven days.

In some cases, a user Investigation priority is a score based on the sum of an activity score and an alerts score. The activity score reflects the probability that this user performed this activity—from 0 (normal activity) to 10 (abnormal activity). The activity score is based on learning the behavior of users, their peers and the entire organization. The activity score is derived from the probability and user impact. The alerts score reflects alerts related to this user. The alert score is derived from alert severity, popularity, and user impact. Since the user investigation priority isn't capped, a percentile is used to prioritize which user to investigate. For instance, a user whose investigation priority score is higher than 99% of other user investigation priority scores would be among the first users investigated.

Embodiments are understood to also include or benefit from tested and appropriate security controls and privacy controls, e.g., it is understood that appropriate measures should be taken to help prevent misuse of the event set and help avoid tampering with the behavior analysis. Use of the tools and techniques taught herein is compatible with use of such controls.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

Conclusion

In short, the teachings provided herein may be applied to enhance 1114 cybersecurity or resource management of a computing system. Cybersecurity peer identification (CPI) technology 200, 202 obtains 1102 security group 214 definitions 216 from an identity directory 230, computes 1106 peerSimilarityScores 212 that represent user 104 similarity in terms of security permissions 406, and submits 1108 contextual cybersecurity peer data 800 to cybersecurity peer-based functionality (CPBF) 236. CPBF code 236, 600 may then perform behavior analytics 604, resource management 606, permissions management 608, or location management 610. Cyberattacks may then be disrupted 1234 or mitigated 1236, and inefficiencies may be avoided or decreased. Having smaller security groups in common gives users higher peerSimilarityScores than having larger groups in common, e.g., through a nonlinear relationship 708, as a result of logarithmic 1218, reciprocal 1220, or other score functions 218. Security group definitions 216 are refreshed 1102 and peer scores 212 are updated 1106 based on the refreshed group definitions 216 at regular intervals 220 or on demand by CPI code 202, to avoid staleness. Avoiding staleness and reducing or avoiding inefficiencies are also examples of computing system functionality enhancement 1114. CPI code 202 may be tuned 228 by varying 1230 update intervals 220, varying 1226 cutoffs 702, 704 imposed 1104 on the size of security groups 214 to make groups be deemed suitable for use in computing 1106 peerSimilarityScores, or by varying other parameters 1000.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 11 and 12 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

One of skill will understand that peer information can be scored according to teachings provided herein, in many situations. In particular, the number of user accounts involved, the simplifying assumption that users correspond 1-to-1 with user accounts, the time periods used, the specific functions used by scoring algorithms, the exclusion filters used to focus algorithm input data, and other specifics of the examples discussed above or elsewhere herein are merely illustrative. They do not limit the scope of the teachings presented or the variety of embodiments that are consistent with those teachings. Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A cybersecurity peer identification system, comprising:
a processor;
a memory in operable communication with the processor;
an identity directory API;
a cybersecurity peer-based functionality (CPBF) API; and
a cybersecurity peer identification code which upon execution with the processor performs operations that include (a) obtaining definitions of security groups via the identity directory API, the security group definitions including security group identifiers and corresponding security group membership lists, each membership list listing identifiers of user accounts of users of a guarded computing system that are currently members of a respective security group, (b) for one or more pairs of user account identifiers, computing a peerSimilarityScore value which represents a measurement of similarity of security permissions of the user accounts in the pair, the measurement of similarity based at least in part on which security groups, if any, have both user accounts as members, and (c) submitting one or more pairs of user account identifiers and their respective peerSimilarityScore values to the CPBF API;
whereby the system identifies and submits pairs of user account identifiers and their respective current peer- SimilarityScore values, thereby providing contextual data for utilization by at least one of the following functionalities: CPBF which includes behavior analysis, CPBF which includes intrusion detection, CPBF which includes resource management, CPBF which includes user permissions management, CPBF which includes user location management.

2. The system of claim 1, wherein at least one of the following also occurs:
the cybersecurity peer identification system further comprises: a maxSuitableGroupSize threshold having a value greater than nine, a code which upon execution compares respective sizes of security groups to maxSuitableGroupSize, and a code which upon execution excludes from computation of peerSimilarityScore values any security groups that have more than maxSuitableGroupSize user accounts as members; or
the cybersecurity peer identification code further comprises code which upon execution excludes from computation of peerSimilarityScore values any security groups that have less than two user accounts as members.

3. The system of claim 1, wherein the identity directory API includes code which upon execution performs lightweight directory access protocol operations.

4. The system of claim 1, further comprising the security group definitions residing in the memory, and wherein the users of user accounts that are identified in the security group definitions include at least nonhuman users.

5. The system of claim 1, further comprising an updateInterval which represents a time period that is in a range of one day to six months, and wherein the cybersecurity peer identification code includes code which is configured to upon execution repeat the obtaining, computing, and submitting operations at least once per updateInterval time period over the course of at least three consecutive updateInterval time periods.

6. The system of claim 1, wherein the cybersecurity peer identification code upon execution implements a nonlinear relationship between security group sizes and peerSimilarityScore values whereby smaller security groups make larger contributions to peerSimilarityScore values than larger security groups make to peerSimilarityScore values.

7. A cybersecurity peer identification method, comprising:
automatically obtaining definitions of security groups, the definitions including security group membership lists, each membership list identifying one or more user accounts which are members of a respective security group;
for one or more pairs of user account identifiers, computing a peerSimilarityScore value which represents a measurement of similarity of security permissions of the user accounts in the pair, the measurement of similarity based at least in part on which security groups, if any, have both user accounts of the pair as members;
submitting one or more pairs of user account identifiers and their respective peerSimilarityScore values for utilization as contextual data by cybersecurity peer-based functionality; and
repeating the obtaining, computing, and submitting at least once per updateInterval time period over the course of at least three consecutive updateInterval time periods, where updateInterval represents a time period that is in a range of one day to one hundred days.

8. The method of claim 7, further comprising at least one of the following:
filtering out security groups whose number of member user accounts is greater than a predetermined maxSuitableGroupSize threshold, thereby avoiding use of those filtered out security groups when computing peerSimilarityScore values; or
filtering out security groups whose number of member user accounts is less than a predetermined minSuitableGroupSize threshold, thereby avoiding use of those filtered out security groups when computing peerSimilarityScore values.

9. The method of claim 7, wherein the method is further characterized in at least one of the following ways:
the method implements a relationship between security group sizes and peerSimilarityScore values whereby a security group G1 makes a larger contribution to a peerSimilarityScore value than a security group G2 when G1 has fewer members than G2;
computing a peerSimilarityScore value comprises finding a maxGroupSize which is the size of the largest security group that will be used in computing the peerSimilarityScore value, and also comprises calculating a logarithm whose base depends on maxGroupSize; or
computing a peerSimilarityScore value comprises calculating a reciprocal of a power of a value which is based on a security group's number of members.

10. The method of claim 7, wherein the submitted contextual data identifies a user account u and a user account v as cybersecurity peers, and the method further comprises at least one of the following:
comparing activity in user account u with activity in user account v;
generating an alert in response to determining that an activity X is found in a history of user account u but is not found in a history of user account v;
generating an alert in response to determining that user account u has fewer privileges than user account v;
generating an alert in response to determining that user account u has a human user and user account v has a nonhuman user; or
generating an alert in response to detecting instability of a set of cybersecurity peers of user account u.

11. The method of claim 7, wherein the submitted contextual data identifies a user account u and a user account v as cybersecurity peers, and the method further comprises at least one of the following:
comparing a geographic location of a user of user account u with a geographic location of a user of user account v;
comparing a network location of a resource accessed by user account u with a network location of a resource accessed by user account v;
or identifying a resource that was accessed by both user account u and user account v.

12. The method of claim 7, wherein the obtaining utilizes at least one of the following: LDAP (lightweight directory access protocol), DSML (directory services markup language), SASL (simple authentication and security layer), SAMR (security account manager remote protocol), or a Kerberos protocol.

13. The method of claim 7, wherein the submitting submits for each user account u of a plurality of user accounts at least the N closest cybersecurity peers of user account u based on pairwise peerSimilarityScore values, where N is in a range of 3 to 20.

14. The method of claim 7, further comprising tuning an implementation of the method by performing at least one of the following:

varying a maxGroupSize which is the size of the largest security group that will be used in computing the peerSimilarityScore value, the varying based at least in part on how many false positive security alerts are produced using user account identifiers and their respective peerSimilarityScore values;

varying a value N which limits how many of the closest cybersecurity peers of a user account u are utilized as contextual data by cybersecurity peer-based functionality, where closeness is based on u's peerSimilarityScore values, and the varying is based at least in part on how many other user accounts have resource accesses accessing resources accessed by u; or varying the updateInterval time period, based at least in part on historic data representing at least one of the following: personnel hiring, personnel firing, personnel reassignments, project management activities, or human resources data.

15. The method of claim 7, comprising performing the method at a production scale by doing at least one of the following within a single updateInterval time period:

obtaining membership lists which collectively identify at least fifty user accounts; or computing at least one thousand peerSimilarityScore values for respective pairs of user account identifiers.

16. A storage medium configured with code which upon execution by one or more processors performs a cybersecurity peer identification method, the method comprising:

obtaining definitions of security groups, the definitions including security group membership lists, each membership list identifying user accounts which are members of a respective security group;

for one or more pairs of user account identifiers, computing a peerSimilarityScore value which represents a measurement of similarity of security permissions of the user accounts in the pair, the measurement of similarity based at least in part on which security groups, if any, have both user accounts of the pair as members, the computing implementing a nonlinear relationship between security group sizes and peerSimilarityScore values whereby smaller security groups make larger contributions to peerSimilarityScore values than larger security groups make to peerSimilarityScore values;

submitting pairs of user account identifiers and their respective peerSimilarityScore values for utilization as contextual data by a cybersecurity peer-based functionality; and repeating the obtaining, computing, and submitting at least once per updateInterval time period over the course of at least three consecutive updateInterval time periods, where updateInterval represents a time period in a range of one day to sixty days.

17. The storage medium of claim 16, wherein the method further comprises filtering out security groups whose number of member user accounts is greater than a predetermined maxSuitableGroupSize threshold, thereby avoiding use of those filtered out security groups when computing peerSimilarityScore values, where maxSuitableGroupSize is at least fifty.

18. The storage medium of claim 16, wherein the method is further characterized at least one of the following ways:

computing a peerSimilarityScore value comprises finding a maxGroupSize which is the size of the largest security group that will be used in computing the peerSimilarityScore value, and also comprises calculating a logarithm whose base depends on maxGroupSize; or computing a peerSimilarityScore value comprises calculating a reciprocal of a power of a value which is based on a security group's number of members.

19. The storage medium of claim 16, wherein the method comprises submitting for each user account u only the N closest cybersecurity peers of user account u based on pairwise peerSimilarityScore values, where N is in a range of 5 to 25.

20. The storage medium of claim 16, comprising code which upon execution tunes the method by performing at least one of the following:

varying a maxGroupSize which is the size of the largest security group that will be used in computing the peerSimilarityScore value;

varying a value N which limits how many of the closest cybersecurity peers of a user account u are submitted;

varying the updateInterval time period; or selecting between functions for computing the peerSimilarityScore value.

* * * * *